Figure 2:
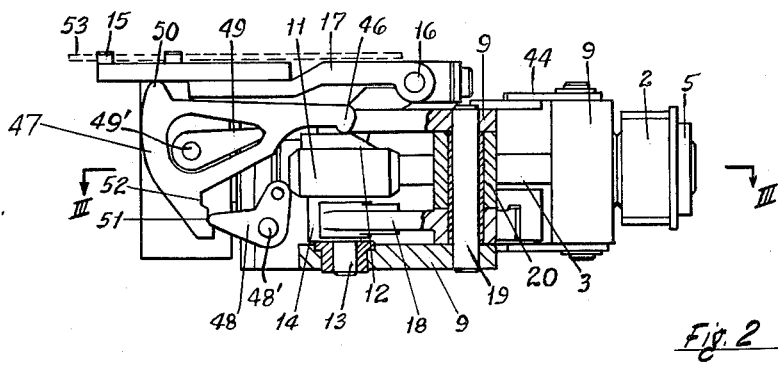

Feb. 1, 1966 G. GUSTIN 3,232,257
CONTROL DEVICE FOR ROTARY HOOK AND MATERIAL-TRANSPORTING
CLAW IN SEWING MACHINES
Filed May 25, 1961 9 Sheets-Sheet 1

Inventor
GIULIANO GUSTIN
By Irwin J. Thompson
Attorney

Feb. 1, 1966  G. GUSTIN  3,232,257
CONTROL DEVICE FOR ROTARY HOOK AND MATERIAL-TRANSPORTING
CLAW IN SEWING MACHINES
Filed May 25, 1961  9 Sheets-Sheet 2

Inventor
GIULIANO GUSTIN
By Irwin J. Thompson
Attorney

Inventor
GIULIANO GUSTIN
By Irwin S. Thompson
Attorney

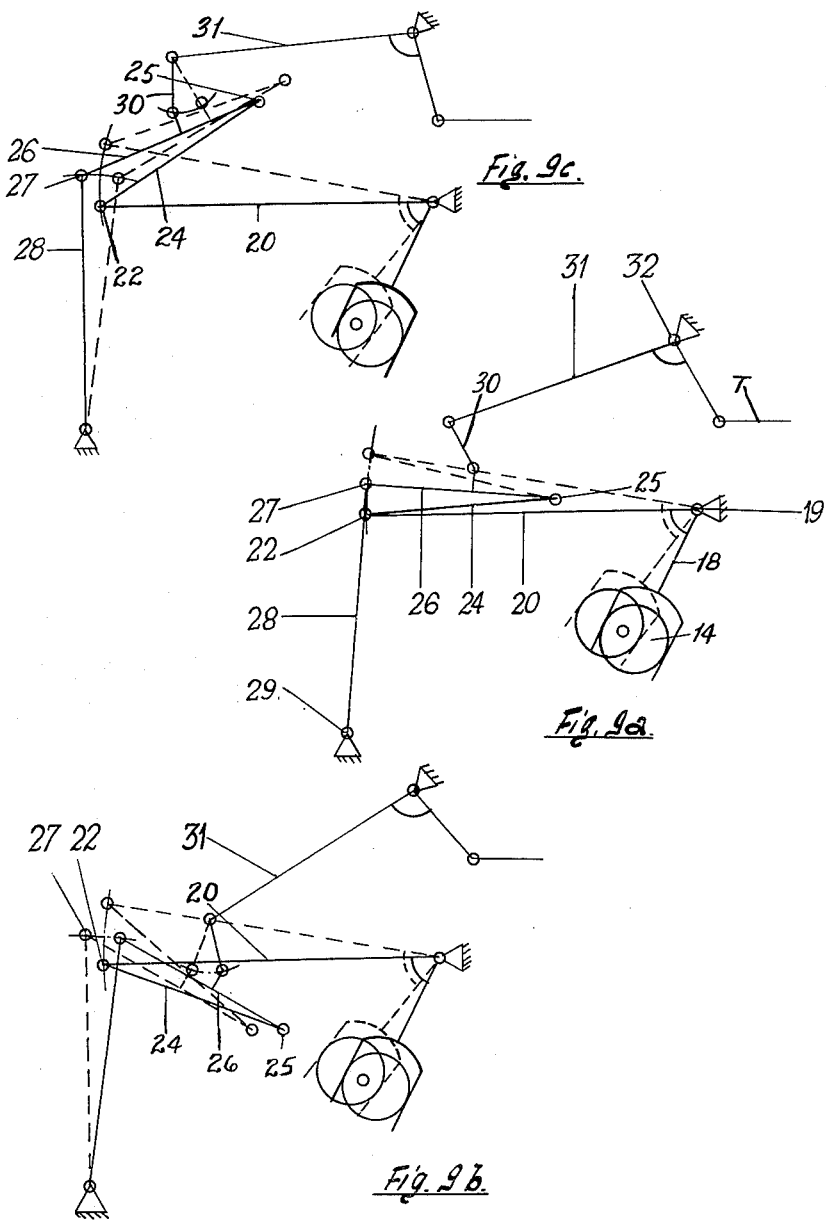

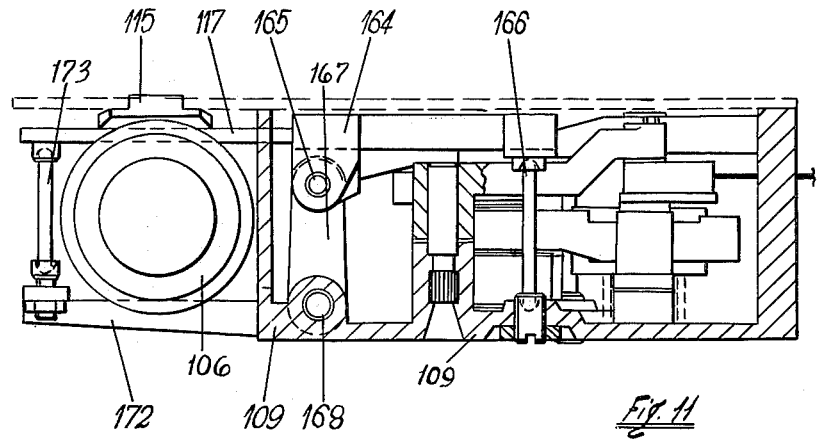
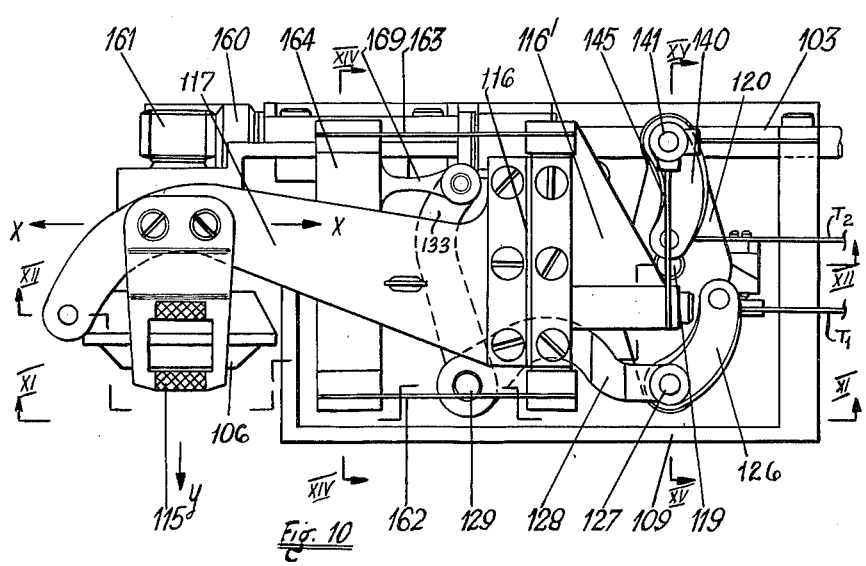

Feb. 1, 1966 G. GUSTIN 3,232,257
CONTROL DEVICE FOR ROTARY HOOK AND MATERIAL-TRANSPORTING
CLAW IN SEWING MACHINES
Filed May 25, 1961 9 Sheets-Sheet 9

Inventor
GIULIANO GUSTIN

By Irwin S. Thompson
Attorney

United States Patent Office 3,232,257
Patented Feb. 1, 1966

3,232,257
CONTROL DEVICE FOR ROTARY HOOK AND MATERIAL-TRANSPORTING CLAW IN SEWING MACHINES
Giuliano Gustin, Milan, Italy, assignor to Soc. per Azioni Fratelli Borletti, Milan, Italy, a company of Italy
Filed May 25, 1961, Ser. No. 112,702
Claims priority, application Italy, May 25, 1960, 9,377/60
12 Claims. (Cl. 112—210)

The present invention relates to sewing machines. It is an object of the invention to provide a self-contained assembly for co-ordinating the movements of the rotary bobbin hook and of the material-transporting claw, the connection of which to the other members of the machine is effected by means of a belt drive or by a bevel gear transmission means which transmit the movement derived from the main shaft of the machine to a common driving shaft of the assembly.

It is a further object of the invention to provide a device for controlling the claw which is adapted to produce movements of the claw in any desired direction.

In sewing machines of known type, control of the rotary bobbin hook is effected by means of levers and countershafts from the main driving shaft of the machine disposed at the top of said machine, from which shaft control of the material-pushing claw is effected in the same way through another independent group of transmission levers. All these lever mechanisms, which are disposed partly within the pillar of the machine and partly below its working surface, fully answer the purposes for which they have been designed when only a longitudinal movement is required to be imparted to the material-pushing claw, that is to say a movement in a direction at right angles to the arm of the machine. On the other hand, when it is also desired to impart transverse movements to the claw, that is to say movements parallel to the arm of the machine, or movements resulting from a combination of longitudinal and transverse movements, the aforesaid mechanisms result in structural complications without however achieving a complete solution of the problem. In fact, in the arrangements heretofore proposed for this purpose, the longitudinal movement is imparted to the claw by a drive acting on its support, while the transverse movement is imparted to the claw by causing the needle plate (in which the claw can slide longitudinally) to shift transversely. Now, by regulating the amplitude of these two basic movements, resultant movements are obtained which may have any direction whatsoever, but the total amplitude of which, in the same sense in the transverse direction, is limited inasmuch as, while the longitudinal movements of the claw effect, as is known, shifting of the material constantly in the same sense as well as in the same direction, the needle plate has a maximum transverse excursion to which the transverse shifting of the material is necessarily tied.

The problem of the shifting of the material in all directions is resolved by the device according to the present invention, in which two movements at right angles which are compoundable and adjustable, both in amplitude and in sense, are transmitted to the support of the claw in such manner that the resultant movement can take place with any desired amplitude, direction and sense.

The device is characterised in that the movements of the rotary hook and of the material-transporting claw are produced by a single substantially self-contained assembly and in that the means actuating the claw all act on the support thereof in such manner as to permit the formation of stitches in indefinite succession in the desired direction and sense.

According to a preferred form of embodiment, the means actuating the claw are constituted by two identical kinematic systems which derive the movement from a single oscillating arm and transmit it to the claw in two directions disposed at right angles. Each system is formed by a pair of levers pivoted to one another at one end, the other end of the first lever being pivoted on the oscillating arm, while the other end of the second lever transmits its movement to the claw, and, moreover, manual adjustment of the position of the first lever with respect to the oscillating arm is provided, the general arrangement being such that the constant oscillation of the arm transmitted to the end of the first lever is converted into an oscillation of the end of the second lever normal to that of the arm and having an amplitude adjustable with the manual adjustment of the position of the first lever.

Figure 1:
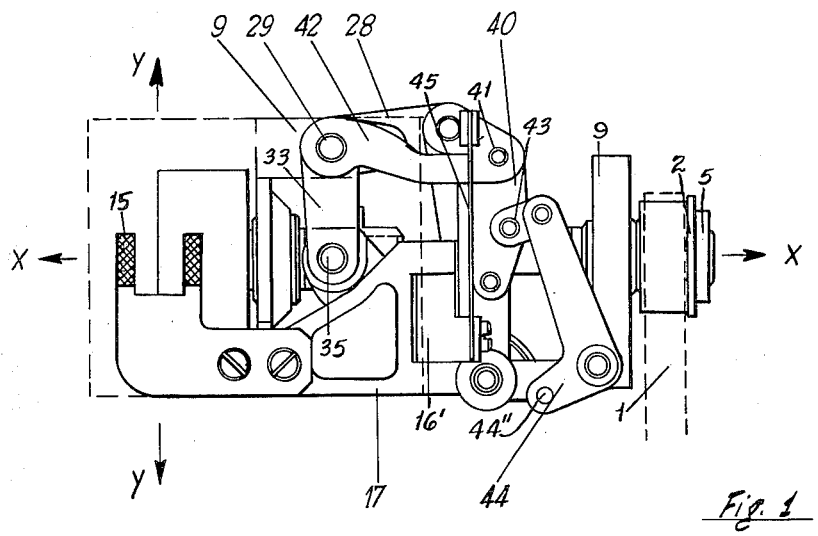
Figure 4:
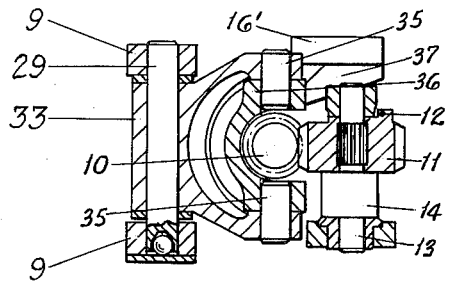
Figure 3:
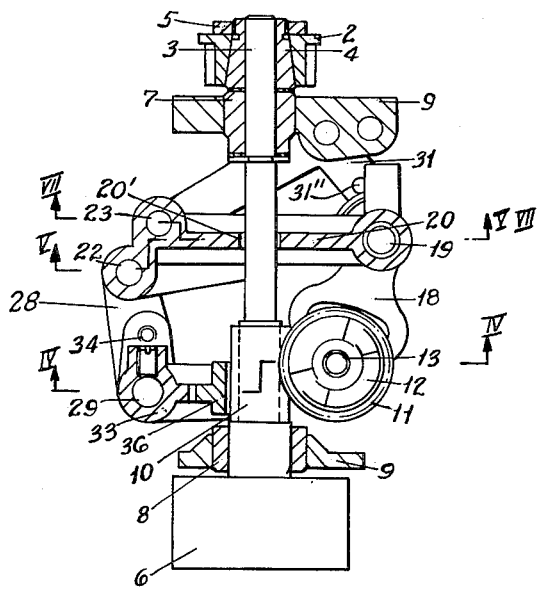
Figure 5:
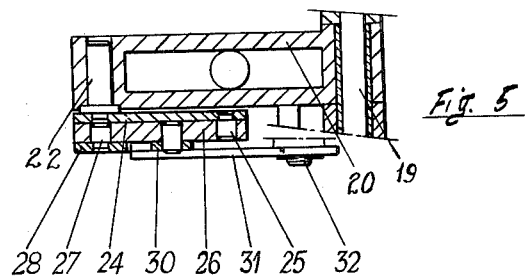
Figure 6:
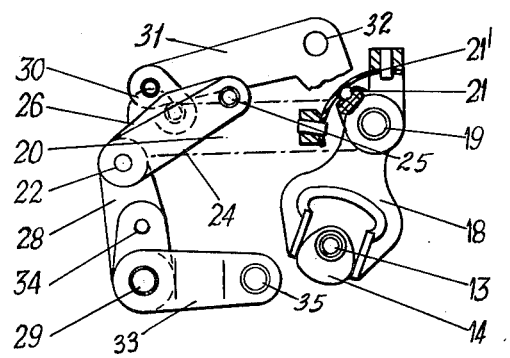
Figure 7:
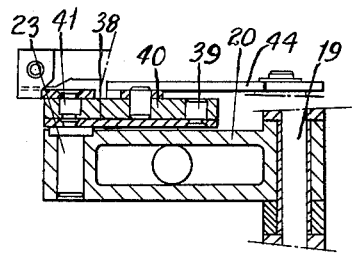
Figure 8:
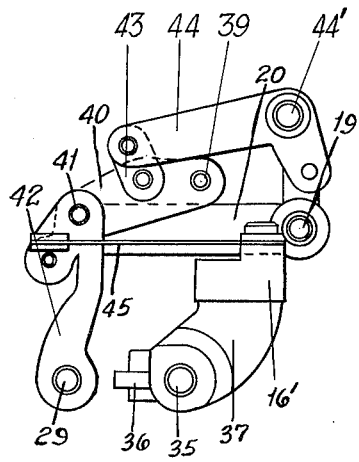
Figure 12:
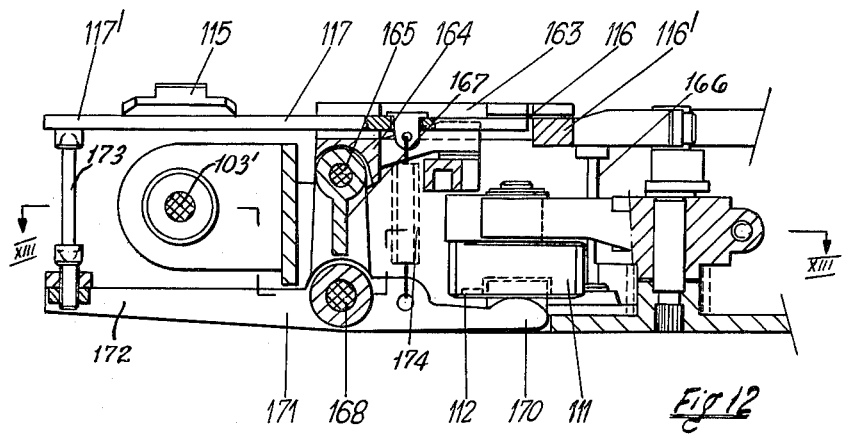
Figure 13:
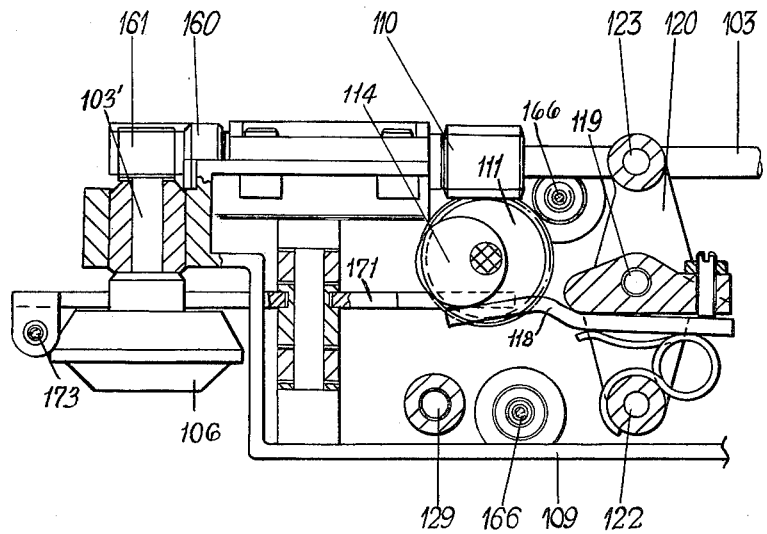
Figure 14:
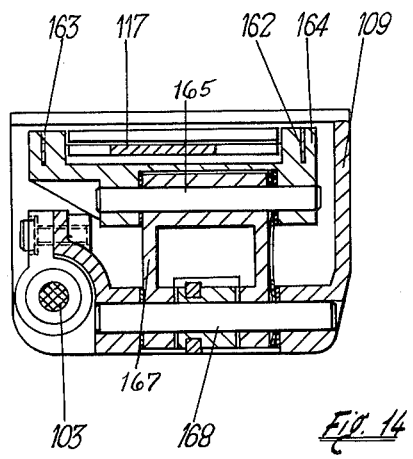
Figure 15:
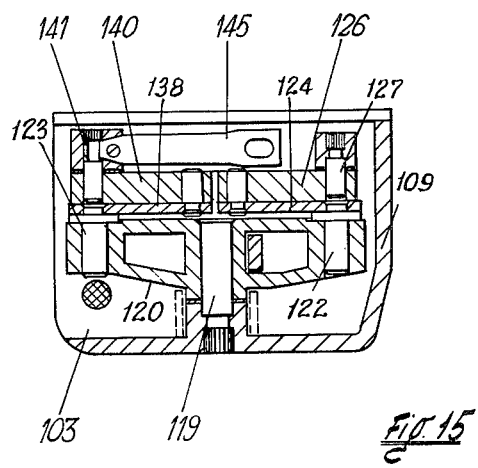
Figure 16:
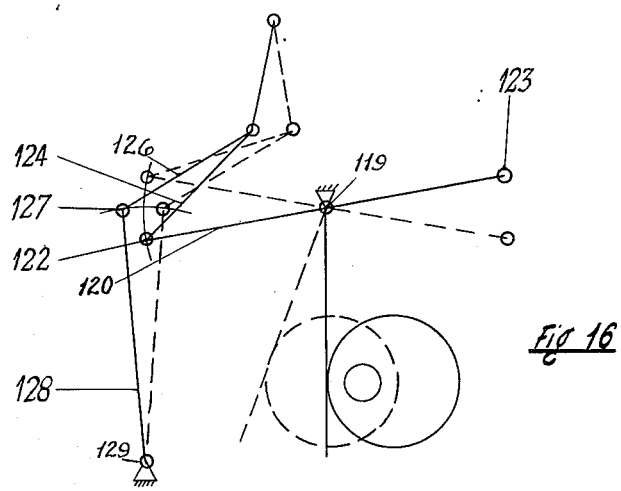

Two embodiments of the invention will now be more fully described with reference to the accompanying drawings, in which:

FIG. 1 is a plan view of the complete assembly of one embodiment with all its elements, FIG. 2 is a side view, with parts in section, of the assembly, from the side where the adjusting controls are located, FIG. 3 is a horizontal section on the line III—III of FIG. 2 with some of the parts removed, FIG. 4 is a vertical section on the line IV—IV of FIG. 3, FIG. 5 is a section on the line V—V of FIG. 3, FIG. 6 shows in plan view one of the two kinematic systems which transmit the movement to the claw, FIG. 7 is a section on the line VII—VII of FIG. 3, FIG. 8 shows in plan view the other one of said kinematic systems controlling the claw, FIGS. 9a, 9b and 9c are diagrams of the operation of the kinematic systems controlling the claw, FIG. 10 is a view, similar to that of FIG. 1, of a second embodiment, FIG. 11 is a section on the line XI—XI of FIG. 10, FIG. 12 is a section on the line XII—XII of FIG. 10 with some of the parts removed, FIG. 13 is a plan view, partly in section, on the line XIII—XIII of FIG. 12, FIGS. 14 and 15 are sections on the lines XIV—XIV and XV—XV of FIG. 10, FIG. 16 is an operation diagram, similar to that of FIG. 9c, relating to the embodiment shown in FIGS. 10 to 15, and FIGS. 17 and 18 show diagrammatically the means for transmitting the motion to the claw in the two different embodiments.

The operation of the entire assembly is effected through a belt 1 which transmits motion to a pulley 2 keyed on a main shaft 3 of the assembly by means of an elastic conical bushing 4 (FIG. 3) clamped in place with a wedging action by means of a threaded ring 5. This system permits of phasing the complete assembly to the other assemblies of the machine, while the internal phasing is carried out when said assembly is put together.

The main shaft 3 transmits its movement directly to a rotary hook 6 and is supported by two bushings 7 and 8 supported by a bracket or frame 9 common to all the members.

On the main shaft 3 there is mounted a helical gear 10 which transmits the movement to a wheel 11 in a halved ratio.

The wheel 11 carries at the top a cam 12 pressed integrally with it and is keyed on a shaft 13 which also carries a three-lobed eccentric 14 (FIGS. 4 and 6).

All the movements of a claw 15 are controlled by this assembly (11 to 14). More precisely, the eccentric 14 controls the movements for transporting the material, while the cam 12 controls the ascending and descending movements of the claw.

As has been said, two movements which are substantially at right angles are impressed on the claw 15 which is carried on a support 17 pivoted on a horizontal pin 16, a longitudinal movement, that is to say a movement directed substantially along the axis of the shaft 3, and a transverse movement substantially at right-angles to the said axis.

Both these movements are transmitted to the claw through the pin 16 and have their origin in the movement of the three-lobed eccentric 14. This eccentric imparts an oscillatory movement to a fork 18 on a pin 19, the said oscillatory movement being transmitted to an arm 20 also pivoted on the pin 19 and coupled to the fork 18. The coupling between the fork 18 and the arm 20 includes an automatic freeing system which in the case of operation being impossible due to difficulties with seams and the like permits the disengagement of the fork 18 and the arm 20. This freeing system is formed (FIG. 6) by a ball 21 acting in a cavity in a spring 21' arranged in the form of an arc and fixed by means of pins to the arm 20. The calibration of the spring 21' enables the ball 21 to leave its seat if the same is subjected to stresses above the calibration limits, thereby preventing in this case the entrainment of the arm 20 which, if subjected to normal stress, on the other hand, remains connected immovably to the fork 18.

For reasons of construction and space, the arm 20 has a central hole 20' through which the shaft 3 passes freely.

At the other end of the arm 20, at 22 and 23, respectively, there are connected the kinematic systems shown in FIGS. 5 and 6 and FIGS. 7 and 8, respectively. The kinematic system shown in FIGS. 5 and 6 is the one which transmits the so-called longitudinal movement to the claw 15. This system (FIGS. 5 and 6) is constituted by a lever 24 pivoted at one end at 22 and carrying at its other end a pin 25, a lever 26 pivoted at one end on the pin 25 and carrying at the other end a pin 27, a lever 28 pivoted at one end on the pin 27, and at the other on a pin 29 fixed to the frame 9. A link 30 articulates an intermediate point of the lever 26 to the end of a two-armed lever 31 pivoted at 32 on the frame 9. On the pin 29 there is also mounted a forked lever 33 (FIG. 4) which is rendered fast with the lever 28 through a screw 34 inserted in an extension thereof. In this way, the oscillations of the lever 28 are transmitted identically to the lever 33. Between the two arms of the forked lever 33 there is disposed rotatably on pins 35 (FIG. 4) an element 36 shaped in the form of an arc and disposed around the gear 10, which thus remains free to rotate with the shaft 3. This element has at the top an extension 37 terminating in a seat 16' for the pin 16.

The operation of the kinematic system (20 to 28) described above will be understood easily on referring to FIGS. 9a, 9b and 9c, in which the elements of said kinematic system are merely shown in lines and dashes and bear the same references as in FIGS. 5 and 6. FIG. 9a shows the eccentric 14, the fork 18 pivoted at 19 and fast with the arm 20, the lever 24 pivoted at 22 and carrying the pin 25, the lever 26 pivoted at 25 and carrying the pin 27 and the lever 28 pivoted at 27 and on the fixed pin 29.

On the lever 26 there is also pivoted the link 30 which is connected to one of the arms of the bell-crank lever 31 pivoted at the fixed point 32. To the other arm of said lever 31 there is fixed a draw rod T adapted to be manually operated.

Under the control of the eccentric 14, the fork 18 and the arm 20 fast therewith perform an oscillation of constant amplitude contained between the positions indicated respectively by solid lines and broken lines. When the pin 25 is in the position shown in FIG. 9a, that is to say substantially on the bisector of the angle contained between the extreme positions of the arm 20, the lever 26 remains substantially still together with the pin 25, while the lever 24 follows the movement of the pin 22. If, by exerting a pull on the draw rod T, the lever 26, and therefore the pin 25, is shifted into the position indicated by solid lines in FIG. 9b, oscillation of the arm 20 will no longer leave the lever 26 motionless, but, by exerting a pull on the lever 24, will cause the pin 25 to move, and with it the lever 26, from the position indicated in solid lines to that indicated in broken lines. In short, the result obtained is that a displacement of the pin 22 in a given direction is transformed into a displacement of the pin 27 in a direction substantially at right angles. Moreover, while maintaining the amplitude of oscillation of the pin 22 constant, regulation of the amplitude of the displacement of the pin 27 is obtained by merely adjusting, through the draw rod T, the deflection of the lever 26, that is to say of the pin 25, with respect to the central position of FIG. 9a. Adjustment of the deflection of the lever 26 in a sense opposite to that described, for example as in FIG. 9c, also permits the movement of the pin 27 in a direction at right angles to that of the pin 22, but of opposite sense (as can be seen clearly by comparing FIGS. 9b and 9c, in which the positions indicated in solid lines represent, in both cases, the starting position).

The oscillation of the lever 28 is then transmitted, through the lever 33, the pin 35, the element 36 and the extension 37, to the pin 16 of the support 17 of the claw. The oscillation of the pin 35, within the limits of its amplitude, can be considered as taking place along the axis $x-x$ of FIG. 1; the movement of the claw 15 also takes place substantially in the same direction when its support is subjected to the control solely of the kinematic system described up to now.

However, as has been said, a kinematic assembly for the transverse movements, that is to say along the axis $y-y$ normal to the axis $x-x$, also acts on the support 17 of the claw.

This kinematic system is almost identical with that for the longitudinal movements. It again derives its movement from the arm 20 through the pin 23 carried by the latter and is constituted (FIGS. 7 and 8) by a lever 38 pivoted at one end on the pin 23 and carrying at the other end a pin 39, a lever 40 pivoted at 39 and carrying at the other end a pin 41, a lever 42 pivoted at one end at 41 and having its other end on the pin 29 fixed to the frame 9; a link 43 articulates an intermediate point of the lever 40 to the end of a two-armed lever 44 pivoted at 44' on the frame 9. To the lever 42 there is fixed, close to the oscillating end pivoted at 41, a connecting rod 45 in the form of a flexible strip or plate, the other end of which is fixed to the seat 16' carried by the extension 37. In this way, the oscillations of the lever 42 around the pin 29 are transmitted to the extension 37 which oscillates around the pin 35. The control means for the device of FIGS. 1-9 comprise rods (not shown) connected to eyelets 31" and 44".

The kinematic system which has just been described operates like that for controlling the longitudinal movements of the claw. In fact, in the transverse kinematic system, the levers 38, 40, 42 and 44 and the link 43, and their connecting pins 23, 39, 41 correspond exactly to the levers 24, 26, 28 and 31, the link 30, and the pins 22, 25 and 27 of the kinematic system described for the longitudinal movements, and they perform the same movements with the same adjustments described with reference to FIGS. 9a, 9b, 9c. That is, as it were, from a constant oscillation of the arm 20 there is obtained an oscillation, in a direction at right angles and of adjustable amplitude, of the lever 42 around the fixed pin 29.

As has been said, the oscillations of the lever 42 are transmitted, through the strip-like connecting rod 45, to the extension 37 which thus rotates around the pin 35.

However, within the limits of the amplitude of the oscillations imparted to said extension 37 and therefore to the seat 16' of the pin 16, it may be assumed that the movements of said seat 16' take place substantially along the axis of said pin 16, that is to say parallel to the axis y—y of FIG. 1. In this way there is obtained a motion transmission which produces from the oscillation of the arm 20 two movements of the pin 16, and therefore of the claw 15, which are substantially at right angles, said movements being adjustable in amplitude and compoundable in a horizontal plane in such manner as to produce movements of said claw resulting, in the pre-selected direction, in a succession of stitches which can even be produced indefinitely in said direction.

Despite the fact that, as has been said, the movements of the support of the claw do not take place exactly in directions parallel to the axes y—y and x—x, but along arcs of a circle having centres at the pins 35 and 29, respectively, it is possible to consider the movements of the claw as sufficiently correct when they are sufficiently small. However, in the case of movements of greater amplitude, the need may arise for a construction which, even if slightly more complex, has more accurate movements. This is the case with the form of embodiment described hereinafter with reference to FIGS. 10 to 15, which embodiment is particularly suitable for use with the axis of the rotary hook disposed parallel to the axis y—y of the assembly.

According to this form of embodiment, a shaft 103 is disposed on one side of the assembly. This shaft again controls the movements of the claw through a worm 110 and a toothed wheel 111, but control of the rotary hook 106 is not effected directly, the axis of the later being located at 90° with respect to the axis of the shaft 103, but through another worm 160 and a gear 161.

The oscillating arm 120 rotatable around the pin 119 is now double. The arm 120 carries the pins 122 and 123 controlling the movements of the claw at its two opposite ends. With these pins there are associated, as in the previous embodiment, pairs of levers 124, 126 and 138, 140 respectively. The free pins 127 and 141 of the levers 126 and 140, respectively, perform, as will be seen, a movement substantially normal to that of the pins 122 and 123 of the oscillating arm, but here, as has been said, the transmission of these movements is much more accurate and correct. Manual control rods $T_1$, $T_2$ are provided to control the movement of levers 126, 140.

This precision derives substantially from the method of mounting and guiding the support 117 of the claw 115. In fact, the support 117 is hinged by means of a flexible plate or strip 116 on a block 116'. The later is associated, through plates 162 and 163, with a block 164 oscillating around a spindle 165 and rests by way of rod 166, on the frame 109 of the assembly. The spindle 165 of the block 164 is carried in turn by an element 167 which can oscillate around a spindle 168 parallel to the spindle 165 and fixed to the frame 109.

The elements 116', 162, 164 and 163 constitute a parallelogram which, owing to the flexibility of the plates 162 and 163, is deformable. The result of this arrangement is that, when the block 164 is still, the block 116', controlled by the movement of the pin 140 through the plate 145, performs, together with the support 117 and the claw 115, a movement parallel to the axis y—y.

Moreover, a second parallelogram is formed by the elements 166, 162, 167 and by the frame 109 and this is also deformable owing to the articulations of 165 and 168 and the substantially spherical bearings of the rod 166. Owing to this arrangement and to the arrangement of symmetrical elements co-operating with the plate 163, the spindle 165, controlled by the movement of the pin 127 through the bell-crank lever 128 pivoted at 129 and the lever 133 on an extension 169 of the element 164, performs, together with the plates 162, 163, the block 116', the support 117 and the claw 115, a movement parallel to the axis x—x.

The result of these arrangements, as has been said, is two movements of the claw 115 exactly parallel to the axes x—x and y—y, which is not obtained in the previous form of embodiment, said movements being compoundable as desired. It may be objected that the movement of the element 116' does not take place exactly parallel to the axis y—y, since the deformation of the parallelogram formed by the elements 162, 164, 163 and 116 causes an approach of the element 116' to the element 164, so that said element 116' has a component along the axis x—x. However, this component may be eliminated by providing for causing the element 164 to perform said movement of approach.

Figure 17:
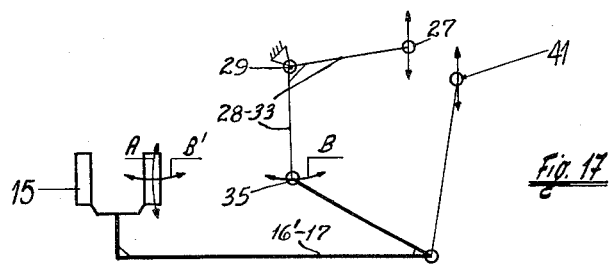
Figure 18:
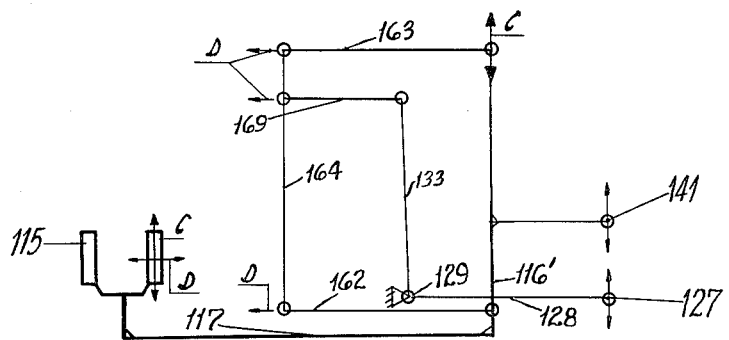

FIGS. 17 and 18 show diagrammatically the means for transmitting the motion from the pins 22 and 23 to the claw, in accordance with the form of embodiment shown in FIGS. 1 to 8 and that shown in FIGS. 10 to 15, respectively. The differences in the operation of the two embodiments are clear from these diagrammatic representations.

From FIG. 17 it will be seen how the rectilinear motion of the pin 41 is transformed into an oscillatory motion, around the pin 35, of the support 16'–17 and consequently of the claw 15, which thus performs the circular arc indicated by the reference A. In similar manner, the rectilinear motion of the pin 27 is transformed into oscillatory motion of the bell-crank lever 28–33 around the pin 29 and therefore of the pin 35 along the arc B. The claw 15 also moves substantially along a similar arc B'.

On the other hand, it will be seen from FIG. 18 how the rectilinear motion of the pin 141 is transmitted almost identically to the support 116', deforming the parallelogram consisting of the sides 116', 162, 164, 163, and the claw 115 is shifted along the rectilinear path C. Thus, the rectilinear motion of the pin 127 also causes the bell-crank lever 128 to oscillate around the pin 129, thereby, however, inducing in the element 164, through the extension 169, a rectilinear motion D which is also followed by the claw 115.

In addition to the movements in a horizontal plane, the assembly according to the present invention also produces the ascending and descending movements of the claw.

As has already been said, these movements are controlled by the cam 12 shaped on the side of the toothed wheel 11. The cam 12 acts by raising the tip 46 of the lever 47 which is obliged by means of a crossed parallelogram system formed by two levers 48, 49 articulated to the frame 9 at 48' and 49', respectively, and which act on the lever 47, to effect only a vertical movement of translation, which movement is transmitted to a projection 50 which directly urges the claw 15 upwardly. Said claw is returned downwardly by a spring not shown in the drawing.

The position of the lever 47 may be modified by operating by means of a manual control on the lever 48, which is urged out of its seat 51 and carried into a notch 52.

The result produced by this latter position is that the raising action imparted to the tip 46 by the cam 12 is transformed into a rotation of the lever 47 approximately around the pivot of the lever 49, without, therefore, obtaining a corresponding raising of the tip or projection 50. This working condition, that is with the claw constantly lowered, is required for certain sewing operations.

The return of the lever 48 to the normal raising position is obtained by means of a return spring which is also not shown in the drawing.

Another form of embodiment of the means controlling the ascending and descending movements of the claw is shown in FIG. 12. This figure shows the cam 112 formed on the side of the toothed wheel 111, which acts on the end 170 of one of the two arms of a lever 171. The latter is pivoted at 168 and carries at the end 172 of its other arm a rod 173 which acts on the free end 117' of the support 117 of the claw. A spring 174 holds the end 170 of the lever 171 against the cam 112 and at the same time holds the end 117' bearing against the rod 173.

It will be obvious from FIG. 12 that when the lever 171 oscillates around the spindle 168 under the control of the cam 112, this oscillation is followed by the support 117 which consequently lowers and raises the claw 115.

It is obvious from the description given above that the movements of the claw in the horizontal plane and the ascending and descending movements, both of which have their origin in the movement of the gear 11, are synchronised with one another, this synchronisation obviously being such as to cause the claw to appear during the transporting stage and to cause it to disappear below the needle plate 53 during the return stage. Moreover, since the movement of the gear 11 is derived from that of the shaft 3, which actuates the rotary hook 6 directly, the rotation of the latter is also synchronised with the movements of the claw.

It is obvious that the invention is not limited to the particular form of embodiment described, but also comprises all those practical constructions which are advised by progress of the art in simplifying the mechanisms, without thereby departing from the scope of the invention.

I claim:

1. In a sewing machine having a rotary hook and a material-transporting claw and support therefor disposed in a frame member of said sewing machine, a device for controlling the movements of said hook and claw and for imparting to said material transporting claw two movements in a horizontal plane substantially at right angles to one another and compoundable, so as to permit the formation of stitches in indefinite succession in the desired direction as well as for applying rotary movement to said hook, comprising in a single mechanical assembly an oscillating arm oscillating at a constant amplitude, a first lever system operatively connected to said arm for transforming the oscillation of said arm into a first oscillating movement having a direction normal to the movement of said arm, means for applying said first movement to said material-transporting claw for imparting to said claw one of said two right-angled movements, a second lever system operatively connected to said arm to transform the oscillation of said arm into a second movement having a direction normal to the movement of said arm, means including a bell-crank lever for applying said second movement to said claw to impart to said claw the other of said two right-angled movements, and means for independently adjusting the amplitude of each of said first and second movements.

2. A device as claimed in claim 1 wherein said two similar lever systems are each formed by a pair of levers pivoted to one another at one end, the other end of each first lever being pivoted on said oscillating arm, while the other end of each second lever transmits its movement to the support of the claw, and wherein independent means is connected to said lever and provides manual adjustment of the position of each first lever with respect to said oscillating arm, the general arrangement being such that the constant oscillation of said arm transmitted to the ends of said first levers is converted into oscillations of the ends of said second levers normal to that of said arm, and said adjustment means independently varies the amplitude of said oscillations of the ends of the second levers.

3. A device as claimed in claim 1, wherein said support of the claw is pivoted on a horizontal pivot forming one side of a horizontally disposed articulated parallelogram, said pivot having imparted thereto displacement parallel to itself by one of said two oscillating movements, the other oscillating movement being applied to the articulated parallelogram as a whole, to obtain a displacement of the parallelogram normal to the pivot displacement direction in order to impart to said support said two movements normal to each other.

4. A device as claimed in claim 2, wherein said oscillating arm has two free ends, the first lever of both of said two similar lever systems being pivoted one on each free end of said oscillating arm, said arm being pivoted at its other end to the frame member.

5. A device as claimed in claim 2, wherein said oscillating arm has two free ends, the first lever of both of said two similar lever systems being pivoted one on each free end of said oscillating arm, said arm being pivoted on the frame member for rotation at its center.

6. A device as claimed in claim 1, wherein said bell-crank lever acts approximately at the effective center of said support of the claw, and a flexible plate-type connecting rod, the other oscillating movement being applied to said support through said flexible plate-type connecting rod.

7. A device as claimed in claim 1, wherein a lever and cam control the movement of said oscillating arm, said lever being actuated by said cam, said lever being pivoted on the same axis as said arm.

8. A device as claimed in claim 7, and calibrated disengaging means, said lever being connected to said arm through said calibrated disengaging means, and means automatically rendering said disengaging means inoperative under abnormal stresses.

9. A device as claimed in claim 7, wherein a second cam is disposed in substantial axial alinement with the cam actuating the oscillating arm but preferably acting in a direction at right angles, said second cam controlling, through a lever means, the ascent and descent of the claw in synchronism with its movements in the horizontal plane.

10. A device as claimed in claim 9, wherein said lever means forms part of a crossed parallelogram system constituted substantially by three levers, two of which are pivoted at fixed points of the frame member, while the third is fulcrumed on the free ends of the other two levers, said levers being disposed in such manner that the movements imparted by the second cam to one end of said third lever are followed by the entire lever means, which thus moves parallel to itself, and are transmitted through its other end to the claw.

11. A device as claimed in claim 9, wherein said lever means is fulcrumed in its center and receives the movement of said second cam at one end, a rod, the other end of said lever means transmitting said movement to the claw through said rod acting on said support of the claw, and spring means maintaining said support in close contact with the rod.

12. A device as claimed in claim 10, and means detachably interconnecting one of said two levers pivoted on the frame with said third lever so that the movements of said second cam can be taken up by said third lever without being transmitted to the claw.

References Cited by the Examiner

UNITED STATES PATENTS

| | | | |
|---|---|---|---|
| 677,318 | 6/1901 | Merritt | 112—205 |
| 2,064,221 | 12/1936 | Roseman | 112—204 |
| 2,311,222 | 2/1943 | Galkin | 112—205 |
| 3,012,531 | 12/1961 | Engel | 112—210 |
| 3,026,832 | 3/1962 | Taketomi | 112—204 |

FOREIGN PATENTS 538,881 11/1931 Germany.
342,457 12/1959 Switzerland.

JORDAN FRANKLIN, *Primary Examiner.*

THOMAS J. HICKEY, DAVID J. WILLIAMOWSKY,
*Examiners.*